United States Patent
Janarthanam et al.

(10) Patent No.: US 8,583,971 B2
(45) Date of Patent: Nov. 12, 2013

(54) ERROR DETECTION IN FIFO QUEUES USING SIGNATURE BITS

(75) Inventors: Sajosh Janarthanam, Austin, TX (US); Jonathan Owen, Northborough, MA (US); Michael Osborn, Hollis, NH (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 383 days.

(21) Appl. No.: 12/977,338

(22) Filed: Dec. 23, 2010

(65) Prior Publication Data

US 2012/0166890 A1    Jun. 28, 2012

(51) Int. Cl.
*G11C 29/00* (2006.01)

(52) U.S. Cl.
USPC ............ 714/719; 714/801; 714/805

(58) Field of Classification Search
USPC .......................... 714/719, 801, 805
See application file for complete search history.

(56) References Cited

U.S. PATENT DOCUMENTS

| | | | | |
|---|---|---|---|---|
| 5,404,332 A | * | 4/1995 | Sato et al. | 365/201 |
| 5,577,055 A | * | 11/1996 | Westerlund | 714/805 |
| 6,345,371 B1 | * | 2/2002 | Lam | 714/719 |
| 6,757,854 B1 | * | 6/2004 | Zhao et al. | 714/719 |
| 6,938,201 B2 | * | 8/2005 | Goyins et al. | 714/805 |
| 7,383,492 B2 | * | 6/2008 | Sailer et al. | 714/801 |
| 7,574,635 B1 | * | 8/2009 | Alfke | 714/719 |

* cited by examiner

*Primary Examiner* — Philip Guyton
(74) *Attorney, Agent, or Firm* — Harrity & Harrity, LLP

(57) ABSTRACT

A first in, first out (FIFO) queue includes logic to provide detection of operational errors in the FIFO queue. The FIFO queue includes entries to store data written to the FIFO queue and signature bits, each signature bit corresponding to one of the entries. A test pattern and a read signature register includes a number of bits greater than a depth of the FIFO queue. A comparator compares the test pattern to the read signature register and output an error signal indicating whether the test pattern matches the read signature register.

25 Claims, 6 Drawing Sheets

ERROR DETECTION IN FIFO QUEUES USING SIGNATURE BITS

BACKGROUND

First in, first out (FIFO) queues are commonly used to organize and control data relative to time and prioritization. In a FIFO queue, data is output in the order in which it is received, so that the first data unit that enters the queue is the first data unit to be output from the queue.

FIFO queues may be particularly useful in controlling data transfer across two different clock domains. In such a FIFO queue, data reads and writes are asynchronous with respect to one another and are initiated using separate write and read signals, which may be launched in separate clock domains. In such a system, errors in the operation of the FIFO queue may occur for a number of reasons, such as: timing issues in the read and write pointers, not enough pointer separation, and/or insufficient depth of the FIFO queue (i.e., overflow and under-run errors).

SUMMARY OF EMBODIMENTS OF THE INVENTION

In embodiments described herein, operation errors in a FIFO queue may be detected based on a signature bit, extracted from a test pattern, that is added to write operations of the FIFO queue. Read operations correspondingly read out the signature bit and store it in a read signature register. When the read and write signature bits do not match, an error condition may be indicated.

According to one embodiment, a device may include a number of storage locations to store data to implement a FIFO queue, where each of the storage locations includes a first portion to store entries of the FIFO queue and a second portion to store a signature value, used for error detection, where write operations to the FIFO queue cause the signature value, of a first plurality of signature values, to be stored in the second portion of one of the storage locations. The device may further include a first register, coupled to the storage locations, and storing second signature values, where read operations to the FIFO queue cause a value corresponding to the signature value, stored in the second portion of a second one of the storage locations, to be written to the first register. The device may further include a comparator to compare the first plurality of signature values, to the second plurality of signature values and to output an error signal when the first plurality of signature values does not match the second plurality of signature values.

In another embodiment, a FIFO queue device may include a first set of entries to store data written to the FIFO queue; a number of signature bits, each signature bit corresponding to one of the entries; a read signature register, including a number of bits greater in number than a number of the signature bits; and a comparator to compare a test pattern value to the read signature register and to output an error signal when the test pattern value does not match the read signature register. Write operations for the device may cause a data item corresponding to the write operation to be written to one of the entries and one of the bits of the test pattern to be written to the corresponding one of the signature bits. A read operation for the device may cause one of the entries and the corresponding one of the signature bits to be read, where the corresponding one of the signature bits is stored in the read signature register.

In yet another embodiment, a method may include disabling error detection relating to errors of a FIFO queue; setting an initial value of a write signature register associated with the FIFO queue; operating the FIFO queue for at least one cycle of write and read operations of the FIFO queue; enabling error detection for the FIFO queue; detecting an error in the operation of the FIFO queue when the write signature register does not match a read signature register, where values from the write signature register are written to the FIFO queue as part of each write operation of the FIFO queue and where values from the FIFO queue are written to the read signature register as part of each read operation of the FIFO queue; and storing, in response to the detection of the error in the operation of the FIFO queue, a copy of the read signature register.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may include a FIFO queue that includes logic to provide reliable and efficient detection of operational errors in the FIFO queue. The FIFO queue may be an asynchronous queue that is used to bridge different clock domains. Write operations to the FIFO queue may be appended with an extra bit selected from a test pattern. During read operations, the extra bit may be read from the FIFO queue and written to a read-side signature register. Operational errors in the queue may be detected based on a non-matching comparison of the test pattern to the signature register.

The systems and/or methods described herein may be used to detect a variety of possible operational errors in the FIFO queue, including errors due to queue overflow or queue under-run. These errors may be used to determine possible problems with the FIFO queue, such as lack of sufficient FIFO queue depth, mismatched read and write clocks, and/or lack of sufficient FIFO queue pointer separation. Using the systems and/or methods described herein, a FIFO queue can be tested in a final implementation (e.g., real silicon) and potentially optimized to take into account real-world timing variations (e.g., process variations, clock crystal variations, etc.) that may not be easily modeled during simulation of a design.

The terms "component" and "logic," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Example System

Figure 1:
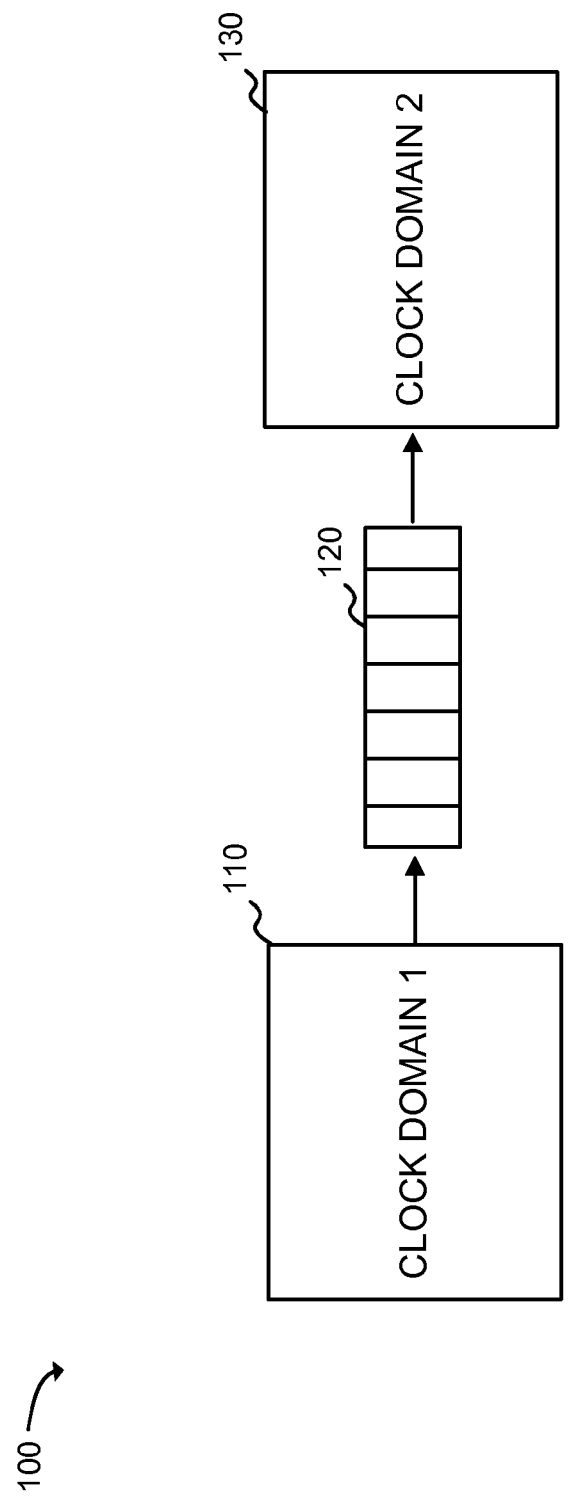
FIG. 1 is a diagram of an example system according to embodiments described herein.

FIG. 1 is a diagram of an example system 100 according to embodiments described herein. As shown, system 100 may include a first clock domain 110 and a second clock domain 130. First and second clock domains 110 and 130 may exchange data through one or more FIFO queues 120. FIFO queue 120 may be an asynchronous FIFO queue that receives data from clock domain 110, based on a clock signal or other signal from clock domain 110, and transmits the data to clock domain 130, based on a second clock signal or other signal from clock domain 130. FIFO queue 120 may thus be used to implement a communication bridge between clock domains 110 and 130.

Clock domains 110 and 130 may generally represent sets of electronic components that function asynchronously from one another (i.e., based on separate clock signals). For example, clock domains 110 and 130 may represent different central processing units (CPUs), graphics processing units (GPUs), processing elements for network device, other computing components, or different sections of a CPU, GPU, network device, etc.

Although a single FIFO queue 120 is illustrated as connecting clock domains 110 and 130, in some embodiments, multiple FIFO queues 120 may connect clock domains 110 and 130. Further, in some embodiments, multiple FIFO queues may bi-directionally connect clock domains 110 and 130. For example, a first FIFO queue may receive write data from clock domain 110 and output read data to clock domain 130 and a second FIFO queue may receive write data from clock domain 130 and output read data to clock domain 110.

Figure 2:
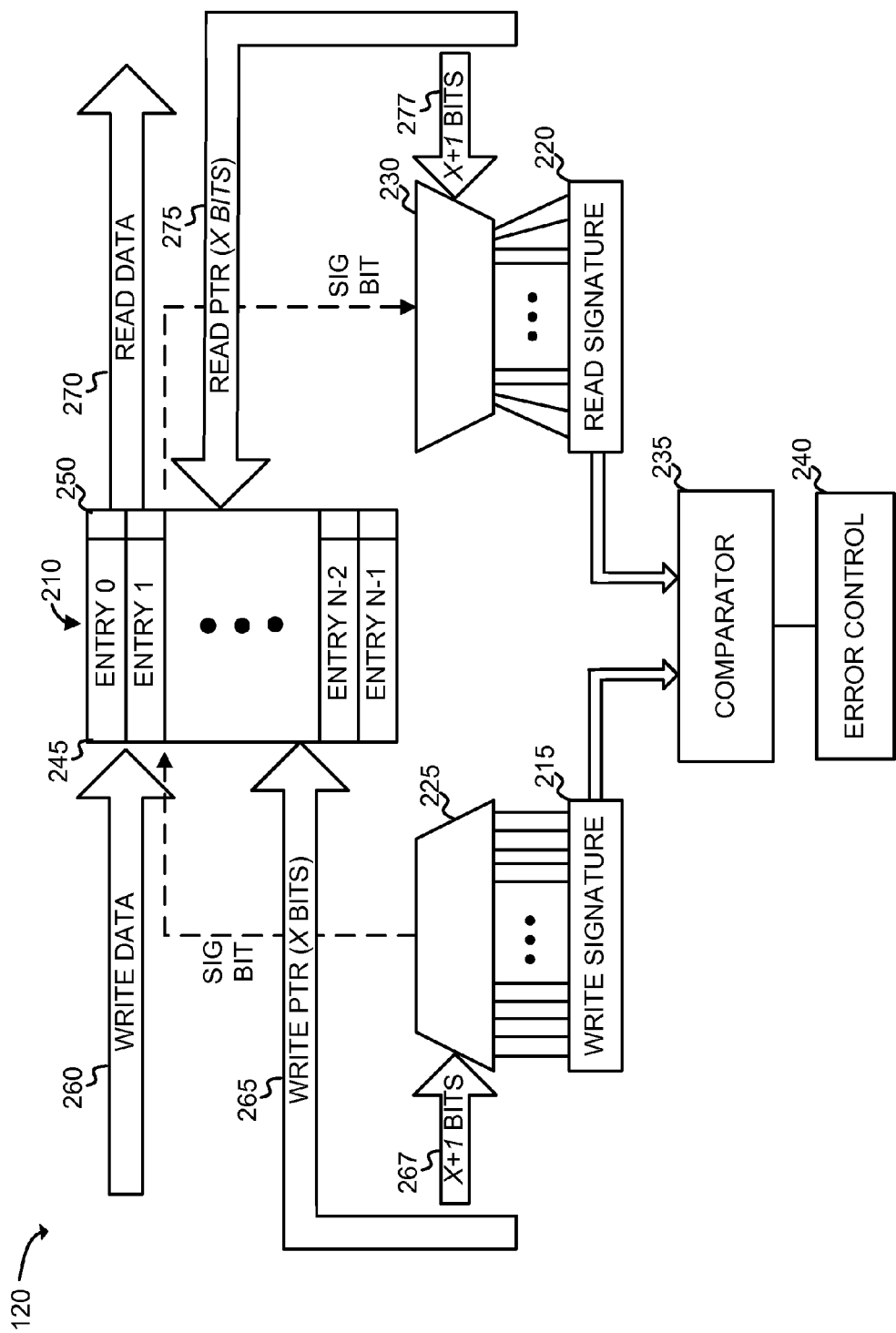
FIG. 2 is a diagram illustrating an example of components in a FIFO queue.

FIG. 2 is a diagram illustrating an example of components in FIFO queue 120. Consistent with aspects described herein, FIFO queue 120 may include error detection circuitry that provides for the detection and reporting of errors in the operation of FIFO queue 120.

As shown in FIG. 2, FIFO queue 120 may include a register array 210, a write signature register 215, a read signature register 220, a write multiplexer 225, a read demultiplexer 230, a comparator 235, and an error control component 240. The components shown in FIG. 2 may be implemented as, for example, a custom circuit that is part of a larger computing or communication device (e.g., a circuit between two CPUs, GPUs, etc.).

Register array 210 may include a number of storage locations, where the storage locations are defined by N entries 245 (ENTRY 0 through ENTRY N−1) and N corresponding signature bits 250. The first portion of each storage location, entry 245, may store the data corresponding to a write operation to register array 210. A write signal 260 (WRITE DATA) may represent the data delivered during a write operation to register array 210. In each write operation, the data for the write operation may be written to one of entries 245, where the particular entry to write to may be determined by the address in a write pointer (WRITE PTR) 265. Additionally, during each write operation, a signature entry (SIG ENTRY), read from signature register 215, may be written to signature entry 250 (i.e., the second portion of each storage location) corresponding to the address in write pointer 265. Thus, during each write operation, the "normal" FIFO data, corresponding to write signal 260, and a signature entry, from write signature register 215, may be written to register array 210 at the address specified by write pointer 265. After each write operation, the address of write pointer 265 may be incremented to point to the next entry in register array 210. When write pointer 265 points to the last entry in register array 210 (entry N−1), incrementing write pointer 265 may include resetting write pointer 265 to point to the first entry in register array 210 (entry 0). Write pointer 265 may be an x bit pointer, where $x=\log_2(N)$.

Signature entry 250 will be primarily described herein as corresponding to a bit. However, in some implementations, two or more bits could be used for each signature bit entry. Using multiple bits per signature entry may allow for detection of additional errors, such as the FIFO queue wrapping multiple times.

Write multiplexer 225 may select which of the entries in write signature register 215 are to be selected and written to register array 210. Write multiplexer 225 may select a bit to output from write signature register 215 based on a multiplexer address signal 267. In one embodiment, multiplexer address signal 267 may be one bit wider (e.g., x+1 bits wide) than the address of write pointer 265.

Write signature register 215 may store the signature entries (error detection values) that are written to signature entries 250 of register array 210. Write signature register 215 may include more bits than there are FIFO entries 245. In one embodiment, if register array 210 has a depth of N (i.e., it stores up to N entries), write signature register 215 may be a 2*N length register. In this embodiment, each complete iteration of write signature register 215 may correspond to two iterations of register array 210.

Read demultiplexer 230 and read signature register 220 may operate similarly to write multiplexer 225 and write signature register 215. During each read operation, the entry 245 pointed to by a read pointer (READ PTR) 275 may be read as a read signal 270. The signature entry 250 corresponding to read pointer 275 may also be read and input to read demultiplexer 230. After each read operation, read pointer 275 may be incremented. As with write pointer 265, incrementing read pointer 275 may include incrementing read pointer 275 to point to the next entry in register array 210. When read pointer 275 points to the last entry in register array 210 (entry N−1), incrementing read pointer 275 may include resetting read pointer 275 to point to the first entry in register array 210 (entry 0).

Read demultiplexer 230 may route the signature entry (SIG ENTRY) from register array 210 to the appropriate location, as determined by a demultiplexer address signal 277, within read signature register 220. In one embodiment, demultiplexer address signal 277 may be one bit wider (e.g., x+1 bits wide) than the address of read pointer 275.

The operations performed by read demultiplexer 230, as described in the previous paragraph, may not actually be implemented with a demultiplexer. For example, the signature entry may be directly input to every entry in read signature register 220. Address signal 277 be used to select which entry of read signature register 220 is to write the signature entry.

Read signature register 220 may store signature entries 250 as they are read from register array 210. Read signature register 220 may include the same number of bits as write signature register 215. As discussed, in one embodiment, if register array 210 stores N entries, read signature register 220 may be a 2*N length register. In this embodiment, each complete iteration of signature register 220 may correspond to two iterations of register array 210.

Comparator 235 may receive the register values of signature registers 215 and 220. Signature bit 215 may be static after the initial update. Hence, signature bit 215 does not require the write-clock to read clock synchronization logic. Comparator 235 may output a comparison result (e.g., an error signal) indicating whether signature registers 215 and 220 match one another. In normal operation, each signature entry read from write signature register 215 should be subsequently written to the same entry address in read signature register 220. Thus, registers 215 and 220 should match one another. During an error condition, however, such as an overflow condition when write pointer 265 "catches" read pointer 275, signatures registers 215 and 220 may no longer match one another. In one implementation, comparator 235 may receive the register value of write signature register 215 during an initialization procedure relating to the test of the FIFO. In another possible implementation, the register value of write signature register 215 may be independently generated in both the read and write domains. With either technique, the value of write signature register 215 may be obtained by the read clock domain so that it can be compared to read signature register 220 during testing.

Error control component 240 may receive the error signal from comparator 235 and may store and/or provide analysis of the error condition. Error control component 240 may be implemented in the read domain. One embodiment of error control component 240 will be described in more detail below.

Although FIG. 2 shows example components of FIFO queue 120, in other embodiments, FIFO queue 120 may include fewer components, different components, differently arranged components, or additional components than depicted in FIG. 2. Alternatively, or additionally, one or more components of FIFO queue 120 may perform one or more other tasks described as being performed by one or more other components of FIFO queue 120.

Figure 3:
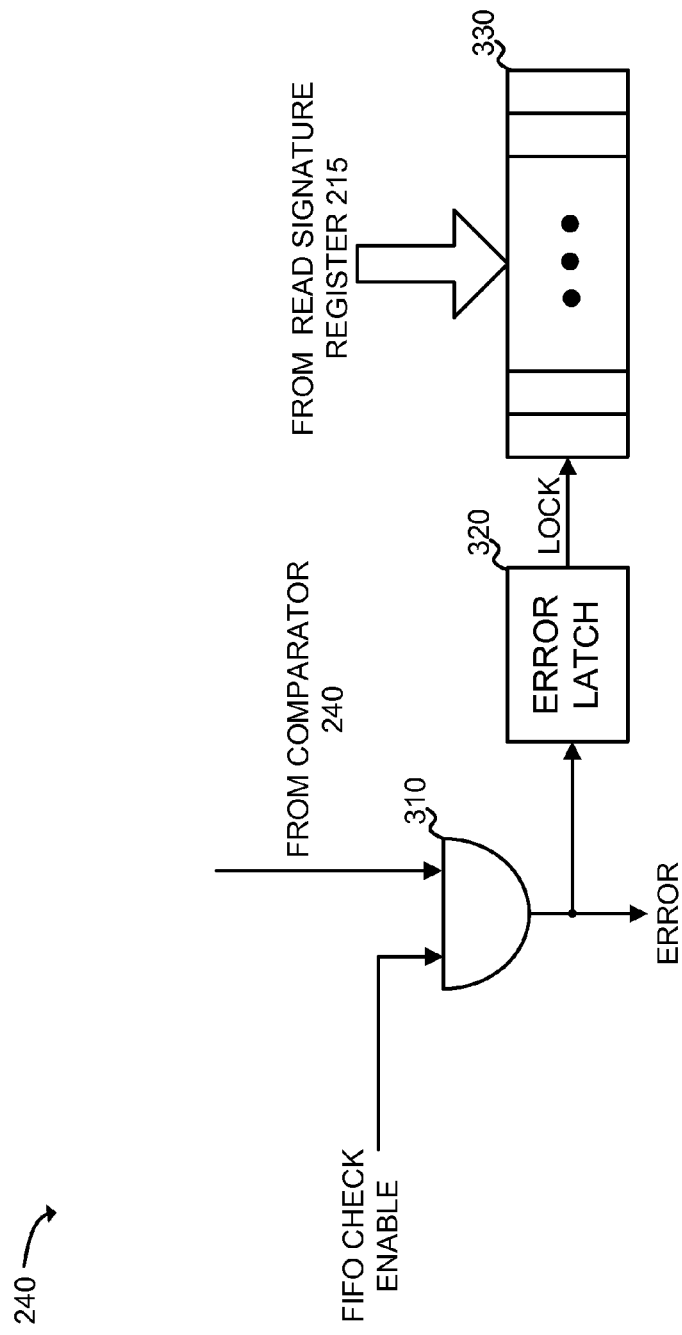
FIG. 3 is a diagram illustrating one example embodiment of an error control component.

FIG. 3 is a diagram illustrating one example embodiment of error control component 240. As shown, error control component 240 may include a gate 310, an error latch 320, and a signature storage register 330.

Gate 310 may include a logical AND gate that is used to enable/disable error detection based on an enable signal (FIFO CHECK ENABLE). When the enable signal is enabled (i.e., logic high), the output of gate 310 (ERROR) may depend on the comparison signal from comparator 240. When the enable signal is disabled (i.e., logic low), the output of gate 310 may be forced to a logic low value regardless of the output of comparator 240.

In response to an error signal (i.e., signal ERROR is logic high), error latch 320 may store the error signal and output a signal (LOCK) to signature storage register 330. Error latch 320 may introduce a one clock signal delay between the reception of the ERROR signal and the assertion of the LOCK signal.

Signature storage register 330 may receive a one clock period delayed copy of read signature register 220. In response to the assertion of the LOCK signature, signature storage register 330 may "lock in" the current value of signature storage register 330 and block further read signature values from being stored by signature storage register 330. The value in signature storage register 330 may then be read out and, for example, analyzed in software, output to a technician, logged, etc.

Although FIG. 3 shows example components of error control component 240, in other embodiments, error control component 240 may include fewer components, different components, differently arranged components, or additional components than depicted in FIG. 3. Alternatively, or additionally, one or more components of error control component 240 may perform one or more other tasks described as being performed by one or more other components of error control component 240.

System Operation

Figure 4:
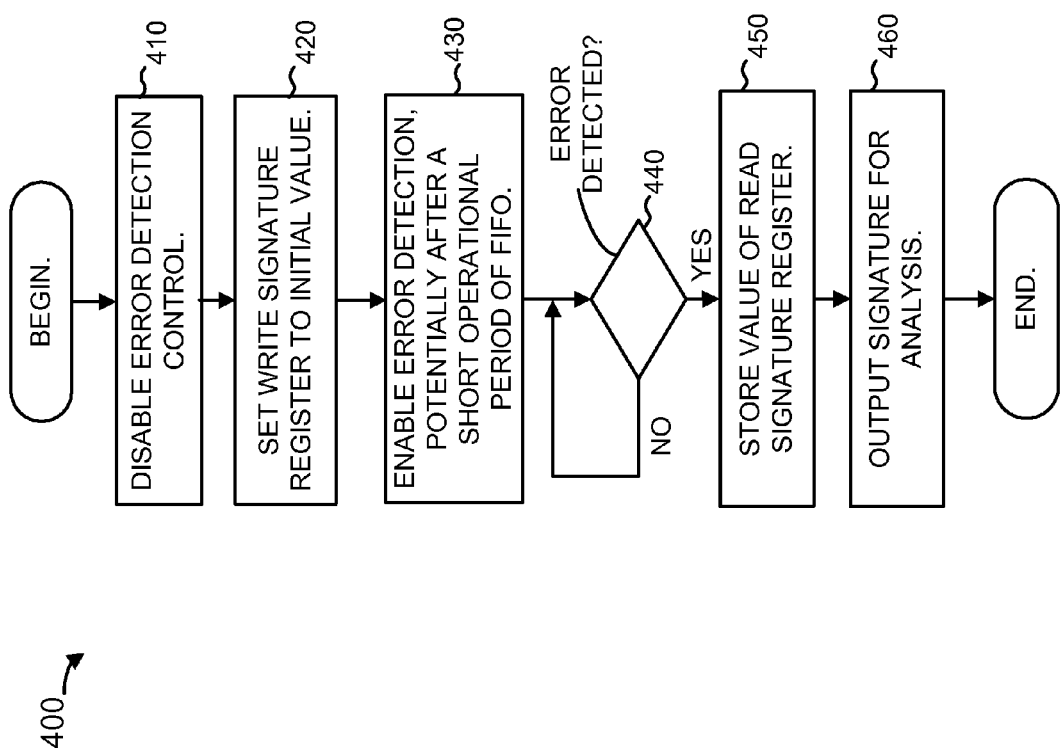
FIG. 4 is a flow chart of an example process for detecting operational errors in a FIFO queue.

FIG. 4 is a flow chart of an example process 400 for detecting operational errors in a FIFO queue. Process 400 may be performed by FIFO queue 120. In some embodiments, configuration options or post error detection analysis, relating to process 400, may be performed by or with the assistance of external logic, such as logic in clock domain 110, clock domain 130, or logic located elsewhere.

Process 400 may include disabling error detection (block 410). As previously mentioned, error detection may be disabled by setting the FIFO CHECK ENABLE SIGNAL to a "disable" state (i.e., setting it to logic low).

Process 400 may further include setting write signature register 215 to an initial value (block 420). In one embodiment, the initial value may be a value that is programmable by the user. For example, a programmable register in clock domain 110 or clock domain 130 may be used to store the initial signature value that is copied to write signature register 215. The programmable register may be, for example, user-settable via a soft-fuse device, a random access memory, or another type of volatile or non-volatile memory. Alternatively, the initial signature value may be permanently programmed during device manufacture.

Depending on the type of analysis being performed, different signature values may be used. For overflow and under-run FIFO error detection, for instance, one possible signature value is one in which the lower half of the signature is opposite that of the upper half. For an eight bit signature field (where each entry is one bit), for instance, the initial signature may be [00001111].

Process 400 may initially include enabling error detection (block 430). The error detection may be enabled after a short delay in which FIFO queue 120 is operating (block 430). The "short delay" may be equal to at least one complete write/read cycle of entries 245 in FIFO queue 120, thus ensuring that both signature registers 215 and 220 are synchronized.

Process 400 may further include detecting an operational error condition in FIFO queue 120 (block 440). Detecting the operation error condition may be performed through the operation of the components shown in FIG. 2. As previously discussed, entries from write signature register 215 may be written to register array 210, along with the substantive queue data, during each write cycle of the queue. If the queue is operating correctly, the signature entry will eventually be read from register array 210 and written to the corresponding location in read signature register 220. If however, there is data corruption in register array 210 (that corrupts the signature entry) or there is an error with the spacing between the write and read pointers (e.g., a pointer overflow or under-run error), the signature entry written to read signature field 220 may not match the corresponding location in write signature register 215, thus generating a not equal compare condition by comparator 235.

Process 400 may further include, in response to detection of an error condition (block 440—YES), storing the value of read signature register 220 (block 450). One embodiment for storing the value of read signature register 220 is shown in FIG. 3. As previously discussed, in response to detection of an ERROR condition, error latch 320 may output, after a one clock cycle delay, a LOCK signal that holds the current value of signature storage register 330. Signature storage register 330 may store a one clock cycle delayed version of read signature register 220.

Process 400 may further include outputting the stored signature value, from signature storage register 330, for analysis (block 460). In one embodiment, the output signature value may be output or logged for manual analysis by an operator. Alternatively, the stored signature value may be automatically analyzed to obtain a higher level error condition that describes the likely failure condition of FIFO queue 120.

Figure 5:
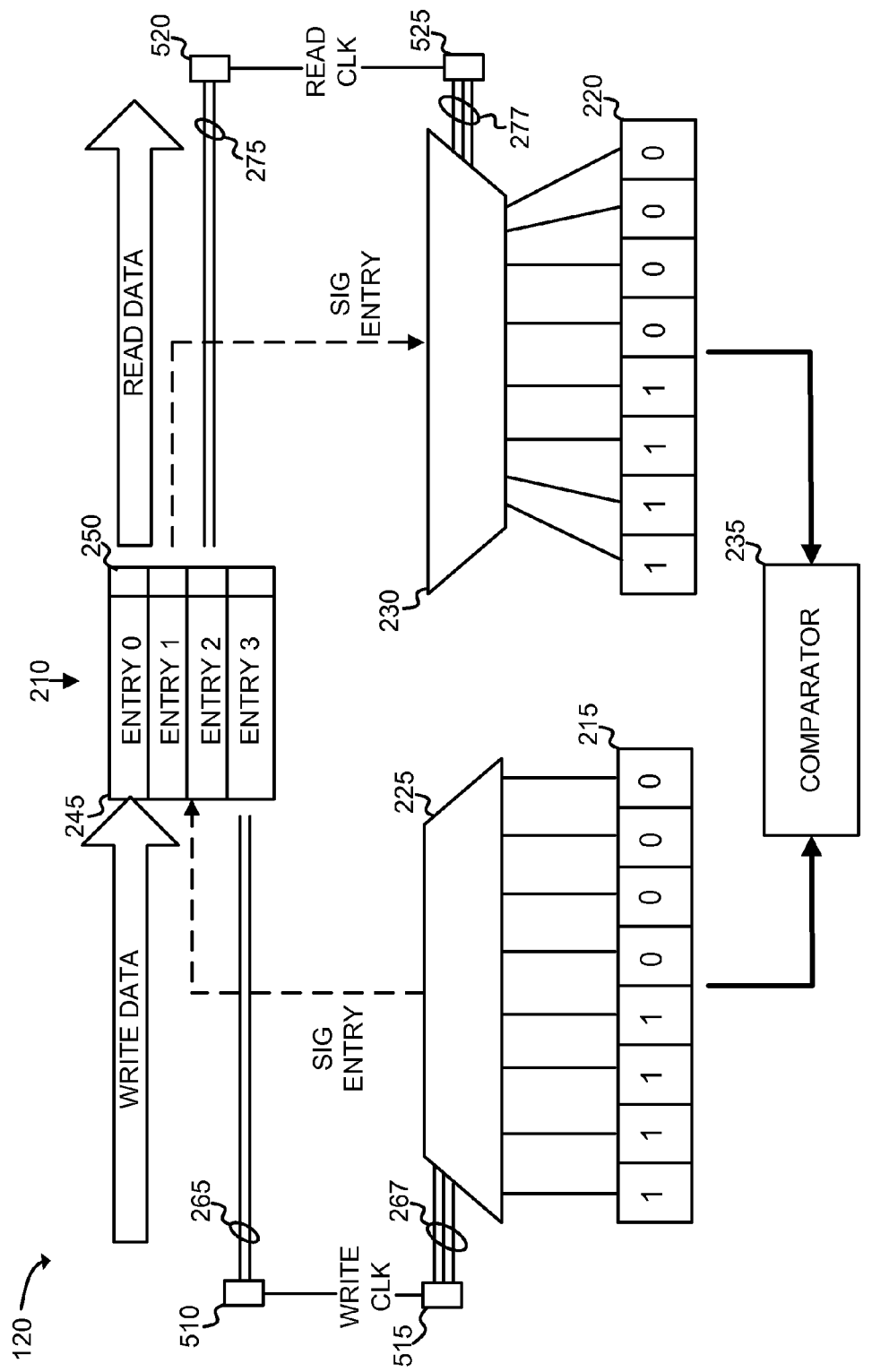
FIG. 5 is a diagram illustrating one example embodiment of select portions of a FIFO queue.

FIG. 5 is a diagram illustrating one example embodiment of select portions of FIFO queue 120. The example shown in FIG. 5 is an example of a specific version of FIFO queue 120, as shown in FIG. 2. In FIG. 5, N is equal to four (i.e., a FIFO queue of depth of four). In practice, the depth of register array 210, and thus the width of signature registers 215 and 220, may typically be larger.

As shown in FIG. 5, register array 210 may include four entries (i.e., the depth of register array 210 may be four) and four corresponding signature entries 250. Accordingly, write pointer 265, which selects the address at which an entry is written, may be a two bit signal. Write signature register 215 is illustrated as an eight bit register (twice the size of register array 210) that includes the signature value "11110000". Accordingly, each write cycle, multiplexer 225 may select one of the eight signature entries to write into register array 210. Multiplexer 225 may thus be controlled by a three bit signal (e.g., multiplexer address signal 267).

Write pointer 265 and multiplexer address signal 267 may be generated by counters 510 and 515, respectively. Counter 510 may be a three bit counter and counter 515 may be a two bit counter. Each of counters 510 and 515 may be incremented by the same write signal (WRITE CLK). In this manner, for each complete iteration of multiplexer address signal 267, write pointer 265 may have completed two cycles through register array 210.

On the read side of register array 210, read pointer 275 and demultiplexer address signal 277 may be two bit and three bit signals, respectively. Read pointer 275 and demultiplexer address signal 277 may be generated by counters 520 and 525, respectively. Counter 520 may be a two bit counter and counter 525 may be a three bit counter. Each of counters 520 and 525 may be incremented by the same signal (READ CLK). In this manner, for each complete iteration of demultiplexer address signal 277, read pointer 275 may have completed two cycles through register array 210.

Figure 6:
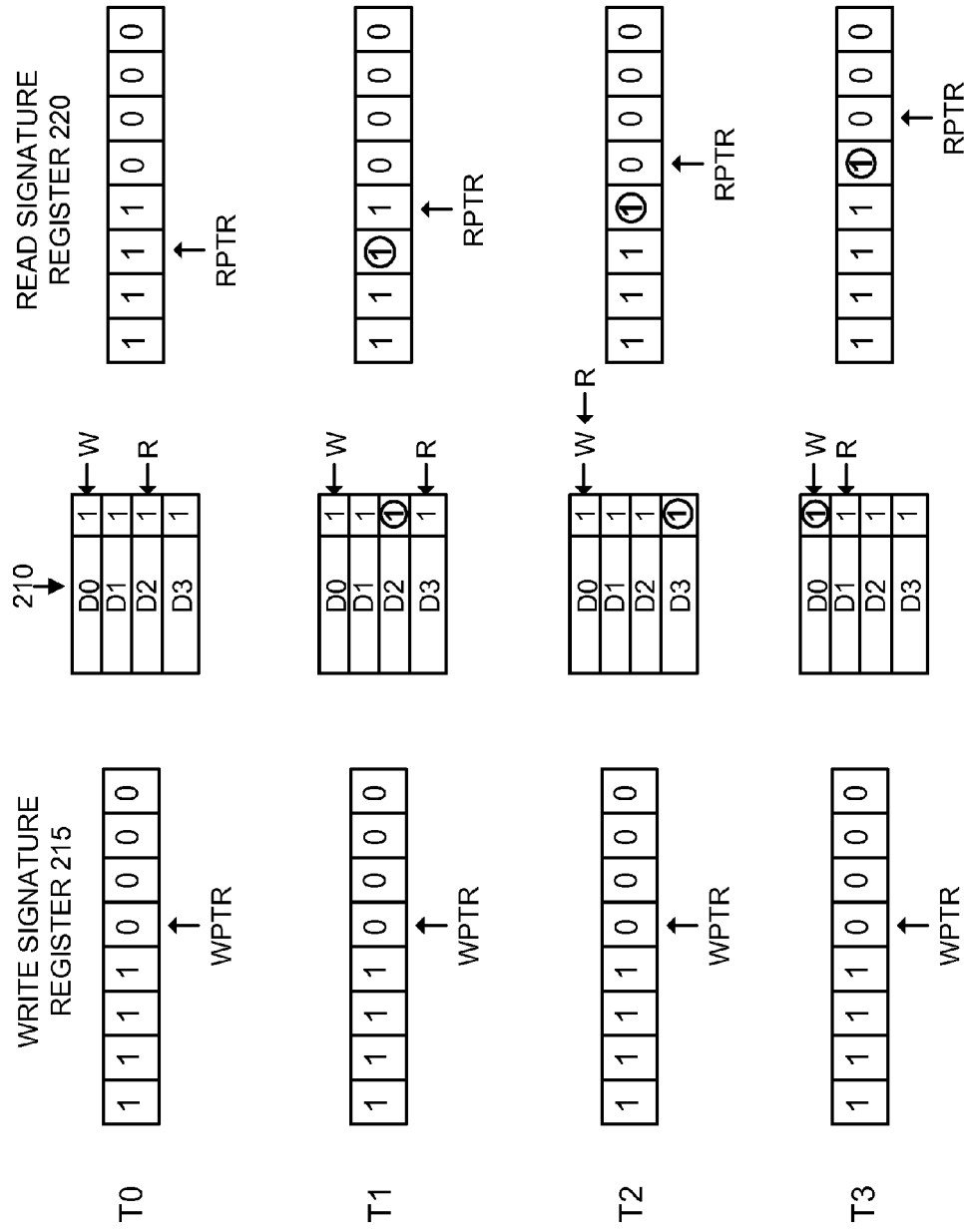
FIG. 6 is a diagram of states of the FIFO queue, as shown in FIG. 5, illustrating an example of an under-run error condition

FIG. 6 is a diagram of states of FIFO queue 120, as shown in FIG. 5, and further illustrates an example of an under-run error condition. In FIG. 6, assume that each signature entry is a one bit value.

In FIG. 6, the state of write signature register 215, register array 210, and read signature register 220 is illustrated over four cycles of the FIFO queue (period T0, T1, T2, and T3). At each cycle, the pointer to the location of the next signature bit to be read from write signature register 215 is labeled as WPTR, the pointer to the location at which the next signature bit will be written to read signature register 220 is labeled as RPTR, and the location of the write and read pointers into register array 210, for the next write and read cycle, are labeled as W and R, respectively.

In period T0, assume that the write signature and read signature are both "11110000," and four FIFO entries (D0, D1, D2, and D3) have been written to register array 210. The next entry that is written to register array 210 will overwrite entry D0 and the next read from register array 210 will be at entry D2.

In period T1, assume a read operation of register array 210 has been processed. The read pointer (R) for register array 210 is advanced one location to the location of entry D3. Additionally, D2 has been read from register array 210 and the signature bit corresponding to D2 (circled in FIG. 6) has been written to read signature register 220 at the location corresponding to the previous position of RPTR (circled in FIG. 6). At this point, write signature register 215 and read signature register 220 match one another.

In period T2, again assume another read operation of register array 210 has been processed. The read pointer (R) for register array 210 is advanced one location to the location of entry D0. Additionally, D3 has been read from register array 210 and the signature bit corresponding to D3 has been written to read signature register 220 at the location corresponding to the previous position of RPTR. At this point, write signature register 215 and read signature register 220 match one another. However, the new positions of the read and write pointers into register array 210 are coincident with one another. Accordingly, the FIFO queue is empty, and if the next read operation is performed before there is a write operation, an under-run error condition will occur.

In period T3, again assume another read operation of register array 210 is received and has been processed. In period T3, entry D0 is read from the FIFO queue. An under-run error condition occurs because entry D0 has already been read. This error may be detected, however, because the signature bit corresponding to D0 has been written to read signature register 220 at the location corresponding to the previous position of RPTR. At this point, write signature register 215 and read signature register 220 do match one another, indicating an error condition. The state of read signature register 220 (11111000) at this point may be used to determine the nature of the error (i.e., a FIFO under-run error).

Referring back to FIG. 6, assume that instead of an under-run error, a FIFO overflow error occurs in which, beginning at cycle T0 three FIFO write operations are processed followed by a read operation. The third write operation will overwrite the position pointed to by the read pointer R, including changing the signature bit for this location. When the read operation is processed, read signature register 220 will be changed to (11010000). Accordingly, write signature register 215 will not match read signature register 220, indicating an error condition. The read signature register value (11010000) may be used to determine that the error condition was a FIFO overflow condition.

As described above, operational errors in a FIFO queue may be detected based on the use of a signature bit that is appended to each entry written to the queue. Advantageously, the error detection can be performed without slowing down the operation of the FIFO queue and can be used to optimize timing of the FIFO queue by taking into account timing variations due to factors such as process variations and crystal clock variations. In this way, pointer separation can be characterized and kept to a minimum, potentially improving performance. Further, the error detection techniques described above can assist in determining the root cause of a problem.

Example Embodiment without Using a Programmable Pattern

In the example implementations discussed above, write signature register 215 was used to store the signature entries to write to the signature entries 250 of register array 210. In some situations, however, a fixed signature pattern may instead be used. For example, instead of using write signature 215 to store a programmable signature pattern, write signature register (and write multiplexer 225) may not be used. Instead, the signature pattern could be derived as a deterministic pattern that can be generated in lockstep in the read and write domains as the read and write pointers advance.

As one particularly example of using a deterministic pattern, an extra bit (e.g., bit X+1) may be added to the write and read pointers. The extra bit may be written to the signature entry 250 at the FIFO entry determined by the "normal" x bits of the write pointer. In this implementation, the signature pattern written to signature entries 250 will alternate between logic high and low values in each successive pass through the FIFO queue (e.g., for an eight bit signature bit pattern, the pattern may be 11110000). The expected signature pattern may be similarly generated on the read side and then used as an input to comparator 235.

The foregoing description of embodiments provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other embodiments. Further, non-dependent blocks may be performed in parallel. In another example, the number of different applications and threads, described herein, were provided for explanatory purposes only.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a first in, first out (FIFO) queue comprising a plurality of storage locations to store data, each of the plurality of storage locations including a first portion to store a corresponding entry of the FIFO queue and a second portion to store a signature value used for error detection, a write operation to the FIFO queue causing the signature value, of a first plurality of signature values, to be stored in the second portion of one of the storage locations, the first plurality of signature values being derived from a pointer signal associated with the write operation to the FIFO queue;
   a first register coupled to the plurality of storage locations and storing a second plurality of signature values, read operations to the FIFO queue causing a value corresponding to the signature value, stored in the second portion of a second one of the storage locations, to be written to the first register; and
   a comparator to compare the first plurality of signature values to the second plurality of signature values, and to output an error signal when the first plurality of signature values do not match the second plurality of signature values.

2. The device of claim 1, where the first plurality of signature values are stored in a second register coupled to the plurality of storage locations.

3. The device of claim 1, where the first plurality of signature values include a first number of bits, the plurality of storage locations include a second number of storage locations, and the first number is twice the second number.

4. The device of claim 3, where the first plurality of signature values and the second plurality of signature values are equal in number.

5. The device of claim 2, further comprising:
   a multiplexer to couple the second register to the plurality of storage locations, the multiplexer selecting the error detection value to store in the second portion of the storage locations based on a multiplexer address signal.

6. The device of claim 5, further comprising:
   a write pointer signal to control which of the plurality of storage locations are used to store data transmitted to the FIFO queue as part of a write operation, where the write pointer signal and the multiplexer address signal are incremented based on the write operation.

7. The device of claim 6, where the write pointer signal and the multiplexer address signal include multi-bit signals that are generated by counters.

8. The device of claim 1, further comprising:
   a demultiplexer to couple the first register to the plurality of storage locations, the demultiplexer selecting, based on a demultiplexer address signal, which of the second plurality of signature values will receive the value corresponding to the signature value.

9. The device of claim 8, further comprising:
   a read pointer signal to control which of the plurality of storage locations are used to transmit data from the FIFO queue as part of a read operation, where the read pointer signal and the demultiplexer address signal are incremented based on the read operation.

10. The device of claim 9, where the read pointer signal and the demultiplexer address signal include multi-bit signals that are generated by counters.

11. The device of claim 1, further comprising:
    a gate to receive the error signal and an enable signal that controls whether errors in the FIFO queue are to be detected, and to output a signal based on the error signal and the enable signal;
    a latch to receive the output of the gate; and
    a storage register, connected to the first register and controlled by an output of the latch, to store and hold a copy of the first register.

12. The device of claim 11, where the gate includes a logical AND gate.

13. The device of claim 1, where the error signal indicates an overflow or under-run error condition by the FIFO queue.

14. The device of claim 1, where an initial value of the first plurality of signature values is user programmable.

15. A device comprising:
    a plurality of entries to store data written to first in, first out (FIFO) queue;

a plurality of signature bits, each signature bit, of the plurality of signature bits, corresponding to one of the plurality of entries;

a read signature register, including a plurality of bits that are greater in number than a number of the signature bits; and a comparator to compare a test pattern value, of a test pattern derived from a pointer signal associated with a write operation, to the read signature register and to output an error signal when the test pattern value does not match the read signature register, the write operation for the device causing a data item corresponding to the write operation to be written to one of the plurality of entries and one of the plurality of bits of the test pattern to be written to the corresponding one of the signature bits, and a read operation for the device causing one of the plurality of entries and the corresponding one of the signature bits to be read, and the read corresponding one of the signature bits to be written to the read signature register.

16. The device of claim 15, where the test pattern is stored in a write signature register that is accessed during the write operation.

17. The device of claim 16, further comprising:

a multiplexer to couple the write signature register to the plurality of signature bits, the multiplexer selecting the one of the plurality of bits of the write signature register that is to be written to the corresponding one of the signature bits; and a demultiplexer to couple the read signature register to the plurality of signature bits, the demultiplexer selecting which of the plurality of bits of the read signature register will store a read one of the plurality of signature bits.

18. The device of claim 15, where the number of bits of the test pattern is equal to twice the number of the signature bits.

19. The device of claim 15, further comprising:

a gate to receive the error signal and an enable signal that controls whether errors in the FIFO queue are to be detected, and to output a signal based on the error signal and the enable signal;

a latch to receive the output of the gate; and a storage register, connected to the read signature register and controlled by an output of the latch, to store and hold a copy of the read signature register.

20. A method comprising:

disabling, by a device, error detection relating to errors of a first in, first out (FIFO) queue;

setting, by the device, an initial value of a write signature register associated with the FIFO queue;

operating, by the device, the FIFO queue for at least one cycle of write and read operations of the FIFO queue;

enabling, by the device, error detection for the FIFO queue;

detecting, by the device, an error in the operation of the FIFO queue when the write signature register does not match a read signature register, values from the write signature register being written to the FIFO queue as part of each write operation of the FIFO queue, and values from the FIFO queue being written to the read signature register as part of each read operation of the FIFO queue; and storing, by the device and based on the detection of the error in the operation of the FIFO queue, a value of the read signature register.

21. The method of claim 20, where the initial value of the write signature register is set so that an upper half of the write signature register is opposite of a lower half of the write signature register.

22. The method of claim 20, where the detected errors include overflow or under-run error conditions by the FIFO queue.

23. The method of claim 20, where the error detection for the FIFO queue is enabled after a delay associated with operation of the FIFO queue.

24. The method of claim 23, where the delay corresponds to a complete write/read cycle of one or more entries in the FIFO queue.

25. The method of claim 20, further comprising:

providing the stored value of the read signature register for analysis.

* * * * *